Dec. 27, 1932.   F. ABELL   1,892,124
SUPERCHARGING INTERNAL COMBUSTION ENGINE
Filed Nov. 22, 1928
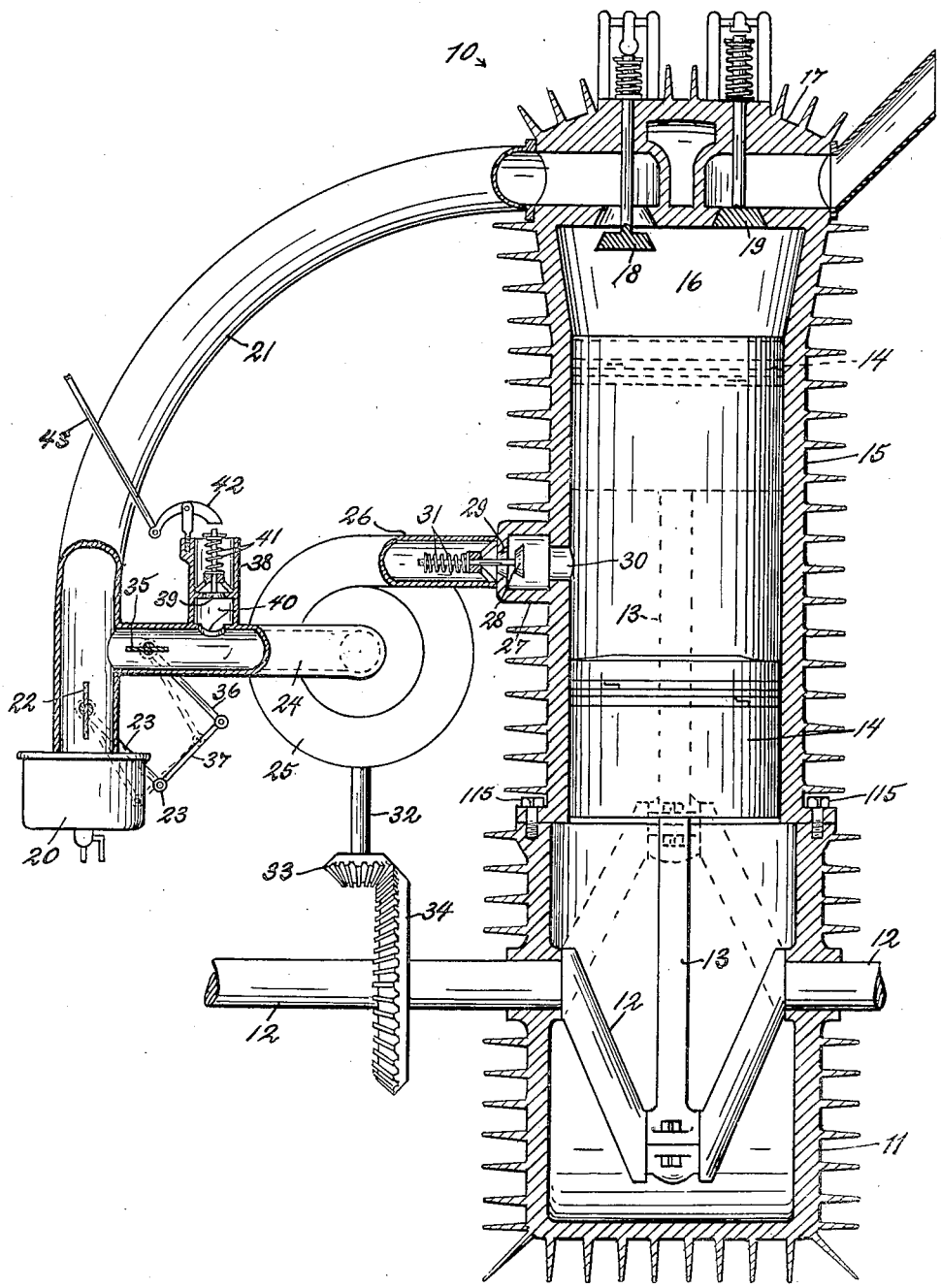
Inventor
Frank Abell.
by
Lockwood & Lockwood,
His Attorneys.

Patented Dec. 27, 1932

1,892,124

UNITED STATES PATENT OFFICE

FRANK ABELL, OF INGLEWOOD, CALIFORNIA

SUPERCHARGING INTERNAL COMBUSTION ENGINE

Application filed November 22, 1928. Serial No. 321,176.

This invention relates principally to improvements in internal combustion engines in which the explosive mixture enters the cylinders through the customary intake valves located in the combustion chamber of the engine cylinders and the supercharging is done through a port located near the end of the piston travel, away from the combustion chamber.

The principal objects of the present invention are first, to provide a way of supercharging an engine with a centrifugal or constant pressure compression without having the entire volume of the engine pass through the compressor, as the amount of air handled by the compressor is one of the factors that determines the horsepower absorbed by it. Second, to operate efficiently a supercharged engine at speeds and loads when the engine is not supercharged; for, if an engine is truly supercharged the character of the fuel must be changed or the clearance space when the piston is at its upper dead center enlarged or both to hold the added mixture of the supercharge to the maximum compression pressure of the fuel used; thus, in a supercharged engine it takes more charge to arrive at the same compression pressure than in an unsupercharged engine; the efficiency of the supercharged engine is increased in the present invention by gradually changing from a supercharged mixture to a stratifying mixture and doing it at a point where it does not affect the firing of the engine, thus helping to hold up the compression as well as provide an oversufficient amount of oxygen. Third, the danger of breaking the impeller of the supercharger, due to back-firing of engine is lessened. Fourth, to provide a way of leaning the cylinder charge at high altitudes, as well as raising the pressure of the supercharger a slight amount.

Further objects and advantages of the present invention will be apparent from the following description, reference being had to the accompanying drawing, where the preferred form of embodiments is shown. 1 represents the engine cylinder; 2 the intake valve; 3 is the intake manifold, or passage which carries the regular explosive charge to the intake valve (2), thence into the cylinder (1), on the charging stroke of the piston (4) ; 5 is a valve operated by pressure differentials acting on it or by mechanical means, such as a camshaft (not shown) through which an additional charge enters cylinder (1), under pressure near the end of the intake stroke of piston (4) ; said pressure being produced by the rotary compressor (6) ; 7 is a valve which controls the mixture contents of the pressure charge. 10 is a valve which controls the supply of air to the compressor (6), thence to cylinder valve (5). Mixture valve (7) being connected to a movable arm (8), which moves with the engine throttle (9). 11 is a movable arm controlled by the operator, and acts on valve 10, to admit more air to the pressure charge.

The operation of the combination is as follows: When the engine is running at its highest load for any relatively high throttle setting, depending on the duty of said engine, the entire pressure charge to valve 5 comes through mixture valve 7, which may be connected to a separate mixture device. It should also be understood that the cylinder receives its low-pressure charge in the regular way, the charge through valve 5 being the pressure charge.

When the load is decreased, or the engine accelerates its load the vacuum pressure in the intake side of the compressor also increases by the higher speed of the compressor, or the added vacuum formed in the engine opens valve 10. On most engines in use now the load increases with the engine speed, which causes a drop in the vacuum produced in the engine. The suction of the compressor increases with the speed of the engine and can be designed to increase its suction so as to operate valve 10 throughout the load range of the engine. It will be seen that when a load is reached that the mixture valve 7 is closed. The action of valve 10 is controlled entirely by the vacuum pressure acting on it, produced by the compressor and piston 4. On some engines depending on its load and the speed of the compressor, separate means will be necessary to stop the action of valve 10 at low throttles to permit proper firing of the engine.

It being understood that the forms of mechanism or relative forms, as herein described, may be used with a single or multi-cylinder engine of either constant or variable speed type.

Further, while the objects and methods of operation and mechanical means employed must conform to certain requirements in order to attain the result. The present invention is not limited to the particular details of construction, placement of parts and operation herein illustrated and described, and that the language of the following claims is not to be restricted to the illustrated embodiments herein shown, but is intended to cover equivalent methods and means.

I claim:

1. In an improvement in internal combustion engines the combination with a cylinder having a tapered inlet end enlarged to form a combustion chamber with an inlet valve opening into said chamber and also having an inlet port arranged about one-third the distance above the lower dead center of the piston travel, a carbureter in communication with said valve, a piston movable in said cylinder to intake a fuel mixture at low pressure through said inlet valve to partly charge said cylinder, of a by-pass pipe connection from said carbureter to the port in said cylinder, a control valve at the inlet end of said pipe connection, a check valve at the discharge end of said pipe connection, a super-charger interposed in said pipe connection between said valves, and a relief valve interposed between said control valve and supercharger.

2. The combination set forth in claim 1 with manual means for opening said relief valve.

3. An improvement in internal combustion engines including a cylinder having an end with a combustion chamber therein, a head to said cylinder, inlet and outlet valves opening into and out of said chamber, a carbureter in communication with said inlet valve, a piston in said cylinder movable to intake a charge of fuel mixture at low pressure through said inlet valve to partly charge said cylinder, a super-charger interposed between said cylinder and carbureter that is adapted to draw a charge of fuel mixture from said carbureter and inject it into said cylinder under higher pressure to finish charging said cylinder for the purpose specified, and means connected with said super-charger for increasing or decreasing the richness of the fuel mixture delivered by said super-charger to said cylinder.

4. In an improvement in internal combustion engines the combination with a cylinder having an inlet end tapered outwardly to form an enlarged combustion chamber, a head closing said end, inlet and exhaust valves in said head, a piston movable in said cylinder for intaking a fuel mixture through the inlet valve to partly fill said cylinder, of a super-charger for injecting a fuel mixture to finish charging said cylinder, said super-charger including a check valve for controlling an inlet port into said cylinder, a by-pass passage from a carbureter through said super-charger to said port, a control valve for opening and closing the by-pass passage, and a relief valve for admitting unmixed air to said super-charger when said control valve is closed.

5. An improvement in internal combustion engines including a cylinder having a fuel inlet passage at one end of its combustion chamber, and a fuel inlet port adjacent its other end, a carbureter, a relatively large pipe connection between said carbureter and the fuel inlet at the end of the combustion chamber, a smaller pipe connection between said large pipe and said fuel inlet port, a supercharger interposed in said smaller pipe connection, butterfly throttle valves in said pipe connections that are connected by a link so they open and close together, an auxiliary air valve that is interposed between the butterfly valve in said smaller pipe connection and said supercharger that is normally closed and adapted to be opened by suction through said smaller pipe connection, and manually operated means for opening said auxiliary air valve.

FRANK ABELL.

CERTIFICATE OF CORRECTION.

Patent No. 1,892,124.  December 27, 1932.

FRANK ABELL.

It is hereby certified that error appears in the printed specification of the above numbered patent requiring correction as follows: After the heading to the printed specification, beginning with line 1, page 1, strike out all printed matter to the end of line 18, page 2, and insert instead:

This invention relates to improvements in internal combustion engines and the principal object is to increase the power of engines without materially increasing the consumption of fuel. To that end I provide an engine with supercharging means that can be operated to supply a charge of fuel mixture as required to economically operate the engine at its various speeds and loads. In other words I provide an engine that is adapted to intake charges of fuel mixture through its inlet valve in the usual way and then increase the charge to the maximum capacity of the cylinder so that compression of the charges will be relatively uniform, and also so that when the charges are ignited the power of the engine will be increased proportionately to the amount of fuel mixture added to the charge taken into the cylinder in the usual way.

Another object of the invention is to provide a simple means for increasing or reducing the richness of the mixture injected into the cylinder as may be required to satisfactorily operate the engine at varied altitudes and under changing climatic conditions. To that end the supercharger is provided with a valve passage in communication with the carbureter and has another passage to the outer air with valves for controlling the passages so that the richness of the mixture can be varied as conditions for satisfactorily and economically operating the engine may require.

A feature of invention is shown in providing an enlarged chamber in the engine cylinder around the intake valve, which enlargement is made by tapering the cylinder outwardly from the terminal plane at the upper end of the piston stroke, which extra space is filled with fuel mixture by means of the supercharger. In other words the piston on its intake stroke cannot intake sufficient mixture through the intake valve to hold compression up sufficiently to operate the engine efficiently; consequently I provide means for fully charging the cylinder first by the usual suction of the piston at a low pressure and then by injecting additional mixture into the cylinder at a higher pressure.

Other objects, advantages and features of invention may appear from the accompanying drawing, the detailed description and the appended claims.

The accompanying drawing illustrates the invention.

This drawing shows an engine in a central vertical section with a carbureter and supercharger connected thereto, parts indicated diagrammatically.

The engine 10 includes the usual crank case 11 in which the crank shaft 12 is mounted and arranged to drive the piston rod 13 to reciprocate the piston 14 in the cylinder 15 that is secured to the case 11 by bolts 115.

The cylinder 15 has an upper end portion with the bore tapered upwardly and outwardly to form a combustion chamber 16 in which charges of mixture are compressed and ignited to operate the engine. The cylinder 15 terminates in a head 17 in which there is an inlet valve 18 and an exhaust valve 19 that are actuated in the usual way to intake charges of mixture and discharge their burned gases.

The valve 18 is connected to the carbureter 20 by a pipe 21 in which there is the usual throttle valve 22 that is controlled by a throttle lever 23.

A branch pipe 24 has one of its ends connected to the pipe 21 above the throttle valve 22 and its other end is connected to a rotary supercharger 25. This supercharger is connected by a pipe 26 with a housing 27 in which there is a check valve 28. This valve is arranged to control the passage 29 in the housing 27 and also an inlet port 30 through the wall of the cylinder 15.

The valve 28 is normally held closed by a spring 31 and is opened by pressure of either air or mixture of air and fuel driven toward the cylinder 15 by the rotary supercharger 25. The tension of the spring 31 normally holds the valve closed until the pressure in the pipe 26 reaches a predetermined amount that can be increased or decreased by increasing the tension of the spring which can be accomplished either by the well known way of adjustment or replacing it with a lighter or heavier spring.

The inlet port 30 is arranged about one-third the distance above the lower dead center of the travel of the piston so it is open for sometime both as the piston moves downward and upward so that a considerable charge of fuel mixture or unmixed air can be injected into the cylinder on the intake stroke of the piston. It is obvious that the port 30 is also uncovered on the power stroke of the piston but internal pressure of combustion in the cylinder will aid the spring 31 in holding the valve 28 closed during that period, so that danger of back-fire through pipe 26 to the supercharger is minimized.

The supercharger 25 is diagrammatically indicated in the drawing as are other parts and its purpose is to draw a fuel mixture from the carbureter 20 and discharge it through the pipe 26 into the cylinder when the valve 28 is open and the port 30 uncovered by the piston on its intake stroke. It is driven by the crank shaft 12, the connections of shaft 32, bevel gear 33, and bevel gear 34.

I provide means for increasing or reducing the richness of the fuel mixture drawn from the carbureter 20 by the supercharger 25.

A control valve 35 is located in the pipe 24 that is arranged to move in time with the opening and closing of the throttle valve. The throttle lever 23 is connected to the lever 36 of valve 35 by a link 37 so the valves move together to open or close their respective passages.

The pipe 24 has a branch pipe 38 with its free end opening to the outer air. A relief valve 39 is arranged in pipe 38 to normally close the passage 40. This valve is held in closed position by a spring 41 until suction in the pipe 24 overcomes the tension of the spring 41.

When the valve 35 is partly closed suction will open the valve 39 to add clean air to the fuel mixture to reduce its richness and vice versa. It is obvious that the valve 39 will be opened to take unmixed air when the valve 35 is fully closed. If desired a lever 42 can be manually moved by the rod 43 to

1892124 open the valve 39 and reduce the richness of the fuel mixture delivered to the cylinder through the port 30. This lever 43 can be operated at any setting of the throttle valve so that the operator can manually control the fuel mixture injected into the engine cylinder.

In use the engine is operated in the usual way except as to injecting an additional amount of fuel mixture to proportionately increase its power and hold compression of the mixture to a relatively uniform pressure.

The piston moves on its intake stroke to draw into the cylinder a partial charge of fuel mixture, after which the supercharger 25 drives an addition of fuel mixture into the cylinder to finish charging it so that compression will be relatively uniform. In other words, this extra charge of fuel mixture is sufficient to effect the right compression on the whole charge when compressed in the chamber 16.

If the injected charge is clean air or air very lightly charged with fuel it will be in a strata in the bottom of the chamber 16 when under compression with the rich mixture above and in contact with the spark plug so it is easily ignited. The spark plug is not shown in the drawing but it is understood to be in the part of the cylinder head cut away and in position to ignite the charge in the usual way.

And that the said Letters Patent should be read with this correction therein that the same may conform to the record of the case in the Patent Office.

Signed and sealed this 30th day of May, A. D. 1933.

(Seal)

M. J. Moore,
Acting Commissioner of Patents.